Patented Mar. 20, 1945

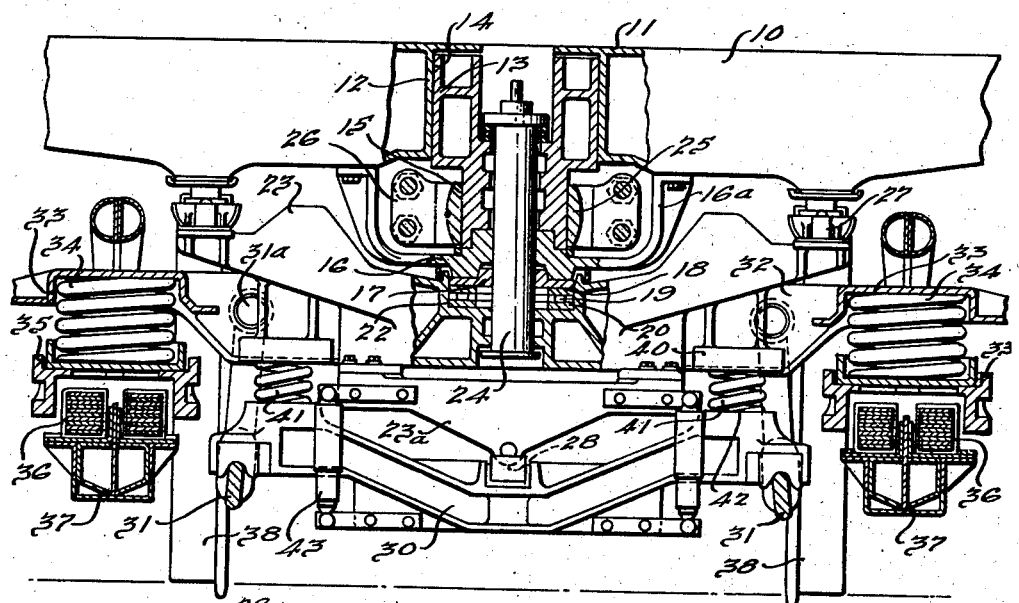

2,371,796

UNITED STATES PATENT OFFICE 2,371,796

TORSIONALLY NEUTRALIZED RAILWAY TRUCK

Carl Breer, Grosse Pointe Park, and Robert N. Janeway, Detroit, Mich., assignors to Railroad Rolling Stock Patents Corporation, Highland Park, Mich., a corporation of Delaware Application August 5, 1943, Serial No. 497,434

16 Claims. (Cl. 105—190)

This invention relates to railway car trucks, of a character adapted for high speed passenger service, and it is particularly directed to the provision of a truck in which heavy intermediate spring-suspended masses, such as the truck bolster and associated parts, are avoided, and wherein the bolster and related parts are concurrently stabilized against torsional strains.

It has long been customary, in railway passenger trucks, to provide a truck frame including transversely disposed transom members resiliently suspended on the wheels and axles, to which are attached laterally movable swing hangers carrying a "spring plank,"—the plank in turn supporting the truck bolster through a second resilient system comprising leaf or coil springs. As is well understood, the car body is provided with a car bolster which engages the truck bolster through a center bearing and pin to have relative turning motion about a vertical axis, and also to have some rocking motion which is limited by engagement of the cooperating parts of the usual side bearings. Such construction necessarily includes a substantial intermediate spring-suspended mass, beginning with the springs between the truck bolster and plank and terminating with the car body itself. This mass, being vertically movable, may be set into sustained vibrations, depending upon the actual vibration frequencies of the several parts, the spacing of the rail joints, and the like. When such vibrations occur, as they invariably will at some particular speed or speeds, they are necessarily transmitted to the car body through the bolster springs. This is extremely unpleasant to the passengers and is also severe on the equipment itself.

The elimination of the intermediate mass just referred to may be effected, of course, by simply positioning the truck bolster directly on the side frames, a simplification which, in one form, has been generally adopted for freight service, wherein lower speeds are the rule, and car vibration is not of such serious consequence. Similarly, it might be inferred that one could simply eliminate the springs from the plank, and secure the plank and truck bolster together as in integral assembly. This, however, leads to other complications. As one side or the other of the truck is elevated by passing over a rail joint, or by encountering some other irregularity, the transversely disposed transom or bolster is subjected to a twisting or torsional strain which is imparted to the car body as an unpleasant rocking motion. To some extent, the conventional spring plank construction minimizes this effect, and for that reason it has been commonplace. However, as just noted, this is at the expense of the vibrations to which an intermediate spring-suspended mass are subject.

According to the present invention, we propose the elimination of the intermediate spring-suspended mass in such manner as to eliminate both the vertical disturbances heretofore encountered, and also the torsional strains developed by the alternative forms of construction just alluded to. Trucks embodying our invention accordingly have improved riding qualities and are capable of operation at high speeds, and they will be found to incorporate some or all of the following features:

First, the substance of the spring suspension system between the car body and the wheels and axles is concentrated between the transom frame and the side frames of the truck, and the customary spring suspension between the truck bolster and plank is eliminated. Herein, the "spring plank" becomes merely a "plank,"—the truck bolster being solidly carried by the plank in such fashion that there is no relative vertical motion between these parts. Limited vertical motion between the truck bolster and transom frame, occurring as an incident to the lateral swinging of the hangers, is of course still possible, but it is not this motion which is contemplated by the feature just discussed.

Second, while there is no vertical motion between the truck bolster and plank, there is nevertheless a rocking motion between these components, occurring about an axis extending longitudinally of the car body. Such rocking motion is not to be confused with the rocking of the car body on its center bearing, as limited by the side bearings, because the motion just referred to occurs between different elements, and also takes place about a center of oscillation which is in a lower horizontal plane. In connection with this feature, it may be here noted that the described rocking action takes place without concurrent vertical displacement between the plank and bolster which is characteristic of the usual intermediate suspension systems. This permissible rocking motion is limited, however, by suitable means such as stabilizing springs, positioned on either side of the rocking pivot, in order to avoid a condition of instability of a body mass mounted on a rocking bearing located below the center of gravity. Also in order to minimize the degree of leaning or tilting of the car on curves, the maximum possible rocking motion is limited by stops, resilient or otherwise, within a magnitude which enables the car body to remain substantially level, and to be relieved from disturbances caused by relative vertical displacements of the side frames of the truck.

Third the conjoint use of the features just mentioned effects both the elimination of intermediate spring-suspended masses and also mitigates the consequences of torsional stresses. To utilize such features to their utmost advantage, or to have an optimum or physically perfect system, the following additional features are desirable,—they represent what might be termed good "geometry," and therefore a way to attain the stated objects of the invention most efficiently. The rocking center of the truck bolster on the plank is longitudinally disposed and it is symmetrically located with respect to the rails, main spring sets on the side frames, and the pivotal centers of the swing hangers on the transom frame. Further, the rocking center of the bolster is in a transverse horizontal plane or line which includes the pivotal centers of the lower ends of the hangers at their points of connection with the plank. The line of centers of the upper pivots of the swing hangers, on the transom frame, also lies in a horizontal plane, and these centers are also located symmetrically with respect to the rails, main springs, and a vertical center line passing through the nominal center of gravity of the car body and the solid pivotal support of the truck bolster on the plank, which vertical axis also is the axis of the center bearing. Such line of centers of the upper pivots may also lie in the horizontal plane of the longitudinal axis of rotation of the transom frame on the main spring suspension. Obviously, none of these desiderata need be incorporated to a point where engineering and dimensional considerations must be ignored, but to the extent that these factors are given due consideration, to that extent will be resulting truck and car carried thereby serve under high speed conditions with neutralization of the customary disturbances.

Finally, it will be found in trucks embodying this invention, that they lend themselves readily to the retention of numerous known features of acceptable railway practice, and that such thucks may be made with considerable savings in weight without sacrifice of strength. It should also be borne in mind that improvements over prior practices may be had by the adoption of parts, rather than the whole, of our invention, and it is accordingly intended that the appended claims should be the measure of the invention set forth in this specification, and that the foregoing review, and also the subjoined detailed description of typical embodiments, should be considered to be informative and illustrative, rather than limiting.

A further consideration of the principles of the invention, and modes whereby they may be utilized in practice, will be made with reference to the accompanying drawing, wherein:

Fig. 1 is a transverse section of a known type of railway truck to which our invention has been applied;

Fig. 2 is a similar view, but illustrating a modified construction; and,

Fig. 3 is a detail of the solid bearing connection between the truck bolster and plank, drawn on an enlarged scale.

In the drawing we have illustrated a car body bolster 10 comprising a casting 11 or other suitable supporting frame provided with a centrally disposed opening 12 within which is welded a filler block 13 comprising an upper cylindrical portion 14 and a lower cylindrical portion 15 of reduced diameter. The lower surface of the cylindrical portion 15 is of stepped construction and rests upon a similarly constructed stepped support 16, mounted upon a bracket composed of two arms 16ª which are secured to the body bolster 10.

The support 16 is likewise provided with an annular stepped lower surface which rests upon a similarly stepped equalizing plate 17 which in turn, rests upon an upper hardened roller bearing plate 18. The plate 18 constitutes part of the center bearing which also comprises rollers 19 and a lower hardened bearing plate 20. The plate 20 rests within a cup shape receptacle 22, the walls of which likewise confine the plates 17 and 18, and the roller members 19. The receptacle 22 is mounted upon a truck bolster 23 and transmits the weight of the car body thereto.

The usual center pin 24 extends through aligned openings in the filler block 13, support 16, plates 17, 18 and 20 and the receptacle 22 and serves to hold these members in alignment. Surrounding the lower cylindrical portion 15 of the filler block 13 is a sleeve type bearing member 25 to which is secured the end of the drawbar 26 by which each vehicle is connected to the next adjacent vehicle of a train. The usual side bearings 27 serve to prevent undue tipping of the body bolster 10 with respect to the truck bolster 23. This type of bearing arrangement is quite satisfactory, but it should be made clear that other center bearings may be used without departure from the present invention.

The truck bolster 23 is provided with a centrally disposed depending portion 23a, integrally connected to the main casting 23, which terminates in an arcuate surface 28 adapted to rest and to roll on a second arcuate surface 28a, of larger radius than the surface 28, as best shown in Fig. 3. The surface 28a is formed on the upper portion of a block 29 which is disposed within a recess 29a in the central part of a transversely disposed supporting member or plank 30. The block 29 may be maintained in spaced relationship with the walls and bottom of the recess 29a by layers of some fairly hard fibrous gasket material, such as rubberized fabric, or a practically solid or incompressible connection may be used. It will be noted that the pivotal connection 28 extends longitudinally with respect to the car and its trucks, and that it is located in, or very near to, the median vertical plane which includes the vertical axis of the pin 24, and also the nominal center of gravity of the car proper. This center of gravity is, of course, above the body bolster 10, and the word "nominal" is believed to be correctly employed, since variations in the amount and distribution of the car lading displace the center of gravity to a certain extent.

The plank 30 extends laterally substantially the width of the truck, and it is pivotally supported at its ends upon the lower ends of swing links 31, which are also pivotally supported at their upper ends, for lateral swinging movement about longitudinally extending axes, on the transom portion of the truck frame 32, as indicated by the reference numeral 31a. The truck frame 32 is provided with laterally extending portions 33 which rest upon a plurality of coil springs 34, positioned between the axles (not shown) which are incorporated in the usual manner in the truck assembly. The coil springs 34 rest upon an intermediate member 35, of relatively light weight and therefore not as disturbing as a heavy intermediate spring-suspended mass, which in turn rests upon springs 36 that are positioned upon side frame members 37. The side frames transfer the weight of the car body to the wheels 38, which are connected through the usual axles and journal bearings (not shown). It will be seen that the spring sets 34, 36 constitute the resilient suspension system for the transom and all parts carried thereby, thus eliminating substantial intermediate spring suspended masses, particularly between the car body and the plank 30. These springs are symmetrically spaced with respect to the median plane, and they are, of course, independent of the bolster 23 and the plank 30.

The pivotal connection between the bolster 23 and the plank 30, provided by the arcuate surfaces 28 and 28a is best located substantially in the plane of the connections between the swing links 31 and the supporting member 30, in order to avoid the application of lateral disturbances of the bolster by rocking movement of the supporting member. That is to say, the line of centers of the links 31 with the plank 30 passes through the pivot 28, and it is at substantially right angles to the median plane therethrough when the system is at rest. Similarly the line of centers of the upper pivots 31a of the hangers on the transom is also horizontal, and therefore parallel to the lower line of centers, and the upper line is moreover adjacent the rocking axis of the transom with respect to the side frames 37. The pivotal centers for the hangers are also symmetrically located with respect to the median plane, so that any disturbance of the resulting quadrilateral linkage may occur about the pivot 28 as a center of oscillation. It has already been noted that a plumb line dropped through the nominal center of gravity of the car will pass through or close to such center of oscillation, and accordingly disturbances which may be resolved about such pivot are not impressed upon the car body, even though the lines of centers are not maintained with mathematical precision.

The bolster member 23 is provided with downwardly facing shoulders 40 disposed in spaced relationship to the central axis thereof, and stabilizing coil springs 41 are disposed intermediate the shoulders 40 and oppositely disposed upwardly facing shoulders 42 on the transversely arranged supporting member 30 adjacent the points at which it is supported by the swing links 31. In addition, and if desired, the truck bolster 23 is connected to the plank 30 by means of shock absorbers 43, disposed one on each side of the centerline of the truck, as shown. These light springs, the shock absorbers, or equivalent damping devices, are intended to limit the degree or amplitude through which the plank oscillates, and to suppress any tendency toward sustained vibration. While they may carry part of the load, and distribute it over the plank, it will be apparent that relative vertical movement between the plank 30 and the bolster 23 is impossible, since the parts are structurally or practically inelastic and they are interconnected at the pivot 28. What has been described includes a rectilinear linkage, the four elements of which are pivotally interconnected, with a loading member or bolster in turn pivoted through a solid or non-resilient connection to one of the links. Hence, if one side of the bolster starts to rise vertically, the solid connection, and the swing hanger linkage, will constrain the other side to follow the same course. The relative motion is therefore purely arcuate, as previously described. In other words, if the angular relation of the bolster about the pivot 28 does not change, a rise in one side of the bolster due to angular movement of the moving links 31 will mean a similar rise in the other side of the bolster. If on the other hand, the rise in one side of the bolster results from angular movement about the pivot 28, then the other side will be correspondingly lowered. To maintain proper functioning, the springs 41 may be preloaded to such degree that the released spring 41 is under some residual compression when its counterpart on the opposite side of the pivot 28 has its coils bottomed by an oscillation of extreme magnitude.

In the operation of the truck illustrated, any irregularity in elevation of one rail, poor rail joint or the like, causes an upward movement of the wheels on one side of the truck. This movement is transmitted through the side frame and, although cushioned by the springs 36 and 34, is transmitted thereby, in diminished amount, to the transom frame 32. From the transom frame 32, it is transmitted by the swing links 31 to the supporting member 30. As one side of the plank rises, the opposite side falls, and the member 30 pivots about its central point 28 permitting the truck bolster to remain substantially in its original position. The supporting member 30 merely rocks on its pivot with respect to the bolster and substantially no torsional movement is transferred to the car body. As the rocking surface 28 is of smaller radius than the surface 28ª, the surface 28 rocks or rolls, rather than slides, on the surface 28ª, and no lubrication is necessary.

Any vertical movement that is transmitted will tend to raise the entire car body uniformly rather than one side only, and can at the most be only a fraction of the movement imparted to the wheels on one side of the truck, which necessarily results in an improvement in the riding qualities of the car.

In Fig. 2 we have illustrated a modified form of our invention in which the truck bolster 23 is provided on the under side of its central portion with a solid pivot member 50 which also serves as an anchorage for the central portion of a transversely disposed multi-leaf spring 51, and which is also provided, on its lower surface, with a convex curved or arcuate pivot portion 52 which rests on and rolls on a concave arcuate surface 53, of greater radius, on a transversely extending plank 54. The member 54 rests, at its ends, on swing links 31, as described in connection with Fig. 1. The ends of the spring 51 rest and slide on flat surfaces 55 on the ends of the supporting member 54. In this instance the spring 51 may be preloaded to support any desired portion of the total load, preferably not more than fifty percent, and the friction between the individual leaves of the spring 51 serves to dampen rocking and vibratory movement of the member 23. The truck bolster and the plank are nevertheless vertically immovable with respect to each other, because the rectilinear linkage is in effect the same as that heretofore described. The main resilient suspension for the transom, bolster, and car is still concentrated in the springs 34, 36, and in all other material respects this form of the invention incorporates the principles and mode of operation previously described.

This specification contains subject matter in common with our previously filed and copending application, Serial No. 379,024, filed February 15, 1941, and we assert all lawful benefits arising from our earlier filing date.

We claim:

1. In a railway car truck, the combination with the wheels and axles and a transom resiliently mounted thereon, of swing hangers depending from the transom and pivoted for lateral swinging movement with respect to longitudinally extending axes, a plank solidly carried by the hangers, a truck bolster solidly carried by the plank, said plank and bolster having a pivotal supporting connection at substantially the median plane of the transom, said pivotal connection being located below the line of centers of the pivotal connections of the upper ends of the swing hangers to the transom, the axis of the pivotal connection between the plank and bolster being horizontally disposed, substantially parallel to said longitudinally extending axes of said swing hangers, and in or adjacent to said median plane.

2. A railway truck comprising a truck frame including a transversely disposed transom, axles, wheels mounted on the axles at opposite ends thereof, a spring suspension system interposed between the wheels and axles and the transom for resiliently supporting the transom, spaced swing hangers pivoted on and depending from the transom, a plank carried by the hangers at the lower ends thereof, a truck bolster mounted on the plank, a structurally rigid pivot connection between the bolster and plank and constituting a supporting and mounting means for said bolster on the plank, said pivot connection having a longitudinal axis, said spring suspension system being spaced from and independent of said plank, bolster, and connection, and means for limiting the angular displacement between the bolster and the plank permitted by said connection.

3. In a railway car and truck assembly, a car body having a center of gravity, a car bolster having a bearing portion disposed below the center of gravity, a car truck including a truck bolster upon which the car bolster is mounted for rotary motion about a vertical axis, a transom on the truck, swing hangers depending from the transom, a plank solidly carried by the hangers, a structurally rigid pivotal connection between the truck bolster and the plank, said connection having a horizontal axis whereby the transom may rock with respect to the truck bolster and the truck bolster and plank are vertically immovable with respect to each other, said pivotal connection being positioned below the center of gravity of the car body and substantially in a perpendicular plane including said vertical axis, and a spring suspension system remote from the bolster and plank for mounting the transom with respect to the wheels and axles of the truck.

4. In a railway car truck, a truck including wheels and axles, a transversely disposed transom, a spring suspension system for resiliently mounting the transom on the wheels and axles, swing hangers pivotally mounted on and depending from the transom, a plank supported on the lower ends of the hangers and in a plane below the plane of their connections to the transom, a truck bolster having a depending and structurally rigid portion extending below the plane of the connections between the hangers and transom, said rigid depending portion bearing upon said plank, said portion being further rotatably supported on the plank thereby to provide for a rocking action between the bolster and plank and to preclude relative vertical motion therebetween.

5. A railway car truck comprising wheels and axles and a transom frame, a spring suspension system including springs positioned between the wheels on each side of the truck and supporting the transom frame, swing hangers symmetrically spaced with respect to a median vertical plane through the transom frame and pivotally mounted upon and depending from said frame, a plank solidly carried by said hangers at the lower ends thereof, the line of centers of the upper pivots of the hangers being substantially horizontally disposed and parallel to the plank, a truck bolster having a structurally depending portion terminating in a solid pivotal bearing engaging said plank at substantially said median plane, said bearing having a longitudinal median axis whereby the plank may oscillate about a center located in said plane to neutralize disturbances occurring from relative vertical elevations and movements of the transom frame, and means for limiting the amplitude of the oscillations of the plank.

6. A railway car truck comprising wheels and axles, spring suspension sets, and means for positioning said spring sets between the wheels on opposite sides of the truck, a transversely disposed transom resiliently carried by said spring sets, swing links pivotally mounted on and depending from the transom, a plank solidly and pivotally carried by the links at the lower ends thereof, the transom, links, and plank defining a pivotally interconnected rectilinear linkage, a bearing point on the plank between the swing links, a truck bolster including a structurally rigid depending portion solidly and pivotally mounted on the plank at said bearing point, the pivots of said linkage having longitudinally extending axes whereby the linkage may swing laterally of the truck, and whereby disturbances of the linkage caused by relative vertical movements of the wheels on the opposite sides of the truck may be resolved by oscillation of the plank about said bearing point, said linkage and said solid pivotal mounting between the bolster and plank precluding relative vertical motion between the bolster and plank, and means for limiting the amplitude of oscillations of the plank with respect to the bolster, said spring sets being spaced from said linkage and plank thereby to eliminate an intermediate spring-suspended mass including said bolster.

7. In a railway car truck having wheels and axles and a truck frame including a transversely disposed transom member, springs interposed between the wheels and axles and transom member to resiliently support the same, swing hangers symmetrically disposed with respect to a vertical medial plane passing through the transom member and depending from the transom member, a plank mounted on the lower ends of the swing hangers, a truck bolster having a structurally rigid depending portion solidly mounted on the plank by means of a pivotal connection, said connection being such as to enable the plank and bolster to oscillate with respect to each other and being located substantially in or adjacent to said plane, said plane moreover including the nominal center of gravity of a car body adapted to be supported on the upper portion of said truck bolster, and other pivotal connections between the ends of the plank and hangers and the hangers and the transom member, said last named pivotal connections being so located with respect to each other and the pivotal connection between the truck bolster and plank as to enable the plank to oscillate with respect to the bolster in response to relative vertical displacements between the wheels on opposite sides of the truck, thereby to minimize torsional strains on the bolster, said springs constituting the suspension system for said truck whereby intermediate spring-suspended masses are eliminated.

8. A railway car assembly including a body and a truck comprising axles and wheels thereon, side frame members extending longitudinally between the axles on opposite sides of the truck, a transversely disposed transom, spring sets interposed between the side frames and the ends of the transom to support the transom with respect to the wheels and axles, said spring sets being symmetrically positioned with respect to a vertical median plane passing through the transom, swing hangers pivotally mounted on the transom for swinging movement about longitudinally extending axes, said hangers having their pivots symmetrically located with respect to said plane, said hangers depending from the transom, a plank positioned laterally of the truck and solidly carried by the lower ends of said hangers, the connections between the plank and said lower ends being also pivotal, a bolster positioned on the plank, said bolster being structurally rigid and having a depending portion pivoted on the plank for rocking movement about a longitudinal axis disposed substantially in said median plane, the line of centers of the connections between the plank ends and the lower ends of the hangers being substantially horizontal and passing through the point of pivotal connection between the bolster and plank, the line of centers of the connections between said hangers and the transom being substantially parallel to the first named line of centers and lying adjacent to the horizontal rocking axis of the transom on said spring sets, said bolster including a center bearing portion having a vertical axis lying in said plane, the car body being adapted to be mounted on said center bearing, the center of gravity of said car body also lying adjacent said median plane, and means for limiting oscillatory movement between the plank and the bolster.

9. In a railway truck, a truck frame, two laterally spaced swing links pivotally mounted on said frame, a laterally extending supporting member pivotally mounted at each end on one of said swing links, a bolster member pivotally mounted centrally on said supporting member and provided with a center bearing adapted to support a car body, the axis of said pivotal mounting being substantially horizontal and extending generally longitudinally of the car body in the plane of the pivotal mountings of the supporting member on the swing links.

10. In a railway truck, a truck frame, two laterally spaced swing links pivotally mounted on said frame, a laterally extending supporting member pivotally mounted on each end on one of said swing links, a bolster member pivotally mounted centrally on said supporting member and provided with a center bearing adapted to support a car body, the axis of said pivot being substantially horizontal and extending generally longitudinally of the car body in the plane of the pivotal connections between said supporting member and swing links, and means engaging said bolster member and said supporting member adapted to yieldingly resist excessive pivotal movement of said bolster on said supporting member.

11. In a railway truck, a truck frame, two laterally spaced swing links pivotally mounted on said frame, a laterally extending supporting member pivotally mounted at each end on one of said swing links, a bolster member pivotally mounted centrally on said supporting member and provided with a center bearing adapted to support a car body, the axis of said pivot being substantially horizontal and extending generally longitudinally of the car body, and means engaging said bolster member and said supporting member adapted to yieldingly resist pivotal movement of said bolster on said supporting member comprising a multiple leaf spring assembly secured at its central portion to said bolster.

12. In a railway truck, a truck frame, two laterally spaced swing links pivotally mounted on said frame, a laterally extending supporting member pivotally mounted at each end on one of said swing links, a bolster member pivotally mounted centrally on said supporting member and provided with a center bearing adapted to support a car body, the axis of said pivot being substantially horizontal and extending generally longitudinally of the car body, and means engaging said bolster member and said supporting member adapted to yieldingly resist pivotal movement of said bolster on said supporting member comprising a multiple leaf spring assembly secured at its central portion to said bolster member and engaging with its ends said supporting member adjacent its points of support on said swing links.

13. In a railway truck, a truck frame, two laterally spaced swing links pivotally mounted on said frame, a laterally extending supporting member pivotally mounted at each end on one of said swing links, a bolster member pivotally mounted centrally on said supporting member and provided with a center bearing adapted to support a car body, the axis of said pivot being substantially horizontal and extending generally longitudinally of the car body, and means engaging said bolster member and said supporting member adapted to yieldingly resist pivotal movement of said bolster on said supporting member comprising a multiple leaf spring assembly secured at its central portion to said bolster member and engaging with its ends said supporting member adjacent its points of support on said swing links, said leaf spring assembly being adapted to support a portion of the load of said bolster member.

14. In a railway truck, a truck frame, two laterally spaced swing links pivotally mounted on said frame, a laterally extending supporting member pivotally mounted at each end on one of said swing links, a bolster member pivotally mounted centrally on said supporting member and provided with a center bearing adapted to support a car body, the axis of said pivotal mounting being substantially horizontal and extending generally longitudinally of the car body in the plane of the pivotal connections between said supporting member and said swing links, and damping means connected to said bolster and to said supporting member at points removed from the pivotal support therebetween.

15. In a railway truck, a truck frame, a supporting member mounted on said truck frame by means of swing links, and a truck bolster member pivotally mounted on said supporting member and provided with a center bearing adapted to support a car body, said pivotal mounting comprising an upwardly facing recess of arcuate cross-section on said supporting member and a downwardly extending projection of arcuate contour mounted on said bolster and adapted to fit into said recess, the radius of the recess being greater than the radius of the projection and the axes of both arcuate surfaces extending generally longitudinally of said truck.

16. In a railway truck, a truck frame, two laterally spaced swing links pivotally mounted on said frame, a laterally extending supporting member pivotally mounted at each end on one of said swing links, a bolster member pivotally mounted centrally on said supporting member and provided with a center bearing adapted to support a car body, the axis of said pivotal mounting being substantially horizontal and extending generally longitudinally of the car body substantially in the plane of the connection between said swing links and said supporting member, and means engaging said bolster member and said supporting member adapted to yieldingly resist pivotal movement of said bolster on said supporting member comprising preloaded springs interposed between said bolster and said supporting member and adapted to bear a portion of the load on said bolster member.

CARL BREER.
ROBERT N. JANEWAY.